United States Patent
Ooya et al.

(10) Patent No.: US 9,822,277 B2
(45) Date of Patent: Nov. 21, 2017

(54) ADHESION IMPROVER FOR AMINE CURING EPOXY RESIN PAINT

(71) Applicant: KUSUMOTO CHEMICALS, LTD., Tokyo (JP)

(72) Inventors: Tomoko Ooya, Saitama-ken (JP); Junpei Suetou, Saitama-ken (JP)

(73) Assignee: KUSUMOTO CHEMICALS, LTD., Tokyo (JP)

(*) Notice: Subject to any disclaimer, the term of this patent is extended or adjusted under 35 U.S.C. 154(b) by 0 days.

(21) Appl. No.: 14/065,697

(22) Filed: Oct. 29, 2013

(65) Prior Publication Data

US 2014/0187670 A1    Jul. 3, 2014

(30) Foreign Application Priority Data

Dec. 28, 2012 (JP) ................. 2012-286947

(51) Int. Cl.

| | | |
|---|---|---|
| *C08L 63/00* | (2006.01) | |
| *C09D 163/00* | (2006.01) | |
| *C08L 29/10* | (2006.01) | |
| *C09D 129/10* | (2006.01) | |
| *C08L 33/06* | (2006.01) | |
| *C08L 33/08* | (2006.01) | |
| *C08L 33/10* | (2006.01) | |
| *C09D 133/06* | (2006.01) | |
| *C09D 133/08* | (2006.01) | |
| *C09D 133/10* | (2006.01) | |
| *C08G 59/50* | (2006.01) | |
| *C08F 220/18* | (2006.01) | |
| *C08F 216/14* | (2006.01) | |
| *C09J 133/10* | (2006.01) | |
| *C08G 59/40* | (2006.01) | |

(52) U.S. Cl.
CPC .......... *C09D 163/00* (2013.01); *C08F 220/18* (2013.01); *C08G 59/40* (2013.01); *C08G 59/50* (2013.01); *C08L 29/10* (2013.01); *C08L 33/06* (2013.01); *C08L 33/062* (2013.01); *C08L 33/08* (2013.01); *C08L 33/10* (2013.01); *C09D 129/10* (2013.01); *C09D 133/06* (2013.01); *C09D 133/062* (2013.01); *C09D 133/08* (2013.01); *C09J 133/10* (2013.01)

(58) Field of Classification Search
CPC ............... C09D 133/04; C09D 133/06; C09D 163/00–163/10; C09D 133/062; C09D 133/08; C09D 133/10; C09D 129/10; C08L 33/04; C08L 33/06; C08L 63/00–63/10; C08L 33/062; C08L 33/08; C08L 33/10; C08L 29/10; C08G 59/50–59/60; C09K 163/00–163/10; C09J 163/00–163/10; C09J 133/062; C09J 133/08; C09J 133/10; C09J 129/10; C08F 220/18; C08F 216/14; C08F 2220/1825; C08F 2220/1858

See application file for complete search history.

(56) References Cited

U.S. PATENT DOCUMENTS

| | | | | |
|---|---|---|---|---|
| 4,131,572 A | * | 12/1978 | Brendley, Jr. ........ | C09D 133/00 427/185 |
| 4,351,914 A | * | 9/1982 | Khanna ................ | C09D 163/00 523/448 |
| 5,212,245 A | * | 5/1993 | Franks ................... | C09D 5/037 428/334 |
| 6,521,706 B1 | * | 2/2003 | Desai et al. ................... | 525/111 |
| 2006/0068198 A1 | * | 3/2006 | Bratys et al. .................. | 428/337 |
| 2011/0057987 A1 | * | 3/2011 | Inushima et al. ............... | 347/21 |
| 2011/0086174 A1 | | 4/2011 | Lee et al. | |
| 2014/0081036 A1 | * | 3/2014 | Smith ................... | C08F 222/02 549/477 |

FOREIGN PATENT DOCUMENTS

| | | | | |
|---|---|---|---|---|
| CA | 1032285 A1 | * | 5/1978 | |
| GB | 1 423 746 | | 2/1976 | |
| JP | 58-109567 | | 6/1983 | |
| JP | 06324494 A | * | 11/1994 | ............. G03F 7/039 |
| JP | 08198944 A | * | 8/1996 | |
| JP | 09-202821 | | 8/1997 | |

OTHER PUBLICATIONS

Scifinder properties of CAS 7534-94-3 (2017).*
Machine translation of JP-08198944-A.*
European Search Report dated Mar. 6, 2014, in corresponding Application No. 13190653.9.

* cited by examiner

*Primary Examiner* — Kregg T Brooks

(74) *Attorney, Agent, or Firm* — Wenderoth, Lind & Ponack, L.L.P.

(57) ABSTRACT

An adhesion improver for amine curing epoxy resin paint which, when added in a small amount to amine curing epoxy resin paint, is capable of preventing the inhibition of adhesion caused by amine blushing and of giving good interlayer adhesion is provided. This adhesion improver is a composition which contains a polymer obtained by the polymerization of (A) acrylic acid ester and/or methacrylic acid ester which has a formula as follows:

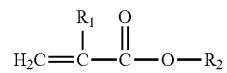

wherein $R_1$ denotes a hydrogen atom or a methyl group, and $R_2$ denotes a branched alkyl group having 3 to 18 carbon atoms, and (B) acrylic acid ester other than (A) above and/or methacrylic acid ester other than (A) above and/or vinyl ether.

3 Claims, No Drawings

ADHESION IMPROVER FOR AMINE CURING EPOXY RESIN PAINT

TECHNICAL FIELD

This invention relates to a novel adhesion improver for amine curing epoxy resin paint which, when added in a small amount to amine curing epoxy resin paint, is capable of preventing the inhibition of adhesion caused by amine blushing and of giving good interlayer adhesion.

BACKGROUND ART

When applied with amine-based curing agent such as polyamine and polyamidepolyamine under low temperature and high humidity, epoxy resin paint has remarkable problems such as the inhibition of adhesion of top coating caused by amine blushing and the blushing of coating film. In order to overcome these problems, it has been proposed to improve amine-based curing agent or to improve epoxy resin.

In connection with the improvement of amine-based curing agent, Official Gazette of Japanese Patent Application KOKAI Publication No. H09-202821 discloses that curing agent which is obtained from a Mannich reaction of (A) a hydroxy aromatic compound modified with an aromatic hydrocarbon formaldehyde resin, (B) a polyamine, and (C) an aldehyde has a comparatively low viscosity and excellent hydrophobicity and allows neither amine blushing nor insufficient crosslinking to occur.

In connection with the improvement of epoxy resin, Official Gazette of Japanese Patent Application KOKAI Publication No. S58-109567 discloses that a corrosion-resistant paint composition which comprises as essential components a liquid polyhydric phenol glycidyl ether type epoxy resin (A) which is a reaction product obtained by the reaction of a monohydric phenol with a reaction product of a polyhydric phenol and epichlorohydrin or by the simultaneous reaction of a polyhydric phenol, a monohydric phenol and epichlorohydrin, wherein monohydric phenol in each of the above-mentioned reactions accounts for 3-15% by weight of the whole reaction products, an amino compound (B) which contains at least two active hydrogen atoms per molecule, and a rust-inhibiting pigment (C) exhibits a very high curing rate, and hardly causes amine blushing.

SUMMARY OF INVENTION

Objective to be Achieved by this Invention

A great deal of labor and cost is required for the change of the designing of curing agent, resin, paint, etc., for the purpose of improvement as mentioned above. There had been known, however, no more convenient way to replace these means for the sake of ameliorating the inhibition of adhesion caused by amine blushing. Thus, the objective of this invention is to provide an adhesion improver for amine curing epoxy resin paint which can be used as a novel, convenient means to ameliorate the inhibition of adhesion caused by amine blushing.

Means to Achieve the Objective

This invention provides an adhesion improver for amine curing epoxy resin paint which comprises a composition which contains a polymer obtained by the polymerization of (A) acrylic acid ester and/or methacrylic acid ester (hereinafter referred to as monomer (A)) which has a formula as follows:

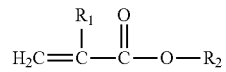

wherein $R_1$ denotes a hydrogen atom or a methyl group, and $R_2$ denotes a branched alkyl group having 3 to 18 carbon atoms, and (B) acrylic acid ester other than monomer (A) and/or methacrylic acid ester other than monomer (A) and/or vinyl ether (hereinafter referred to as monomer (B)), said polymer comprising 50 to 100% by weight, based on the weight of total monomer components, of a portion made from the polymerization of monomer (A) and 0 to 50% by weight, based on the weight of total monomer components, of a portion made from the polymerization of monomer (B), and said polymer having a number average molecular weight of 1000 to 30000. The above-mentioned objective is achieved by adding this adhesion improver to amine curing epoxy resin paint.

Effects of Invention

The adhesion improver of this invention, when added to amine curing epoxy resin paint, can prevent amine blushing and can thereby ameliorate the inhibition of adhesion of top coating caused by amine blushing.

MODE IN WHICH TO WORK THIS INVENTION

The adhesion improver for amine curing epoxy resin paint of this invention contains a polymer which is obtained by the polymerization of monomer (A) and monomer (B). When the proportion of monomer (A) is less than 50% by weight on the basis of the weight of total monomers which are used for the production of the polymer, the effect of preventing the inhibition of adhesion which is caused by amine blushing would be insufficient.

Alkyl group $R_2$ in monomer (A) has 3 to 18 carbon atoms. When $R_2$ has more than 18 carbon atoms, the effect of preventing the inhibition of adhesion which is caused by amine blushing would be insufficient. $R_2$ has preferably 3 to 8 carbon atoms.

The polymer has a number average molecular weight of 1000 to 30000. When the number average molecular weight is lower than 1000 or higher than 30000, the effect of preventing the inhibition of adhesion which is caused by amine blushing would be insufficient. The number average molecular weight is preferably in the range from 2000 to 20000, in particular from 3000 to 10000.

Examples of monomer (A) include (meth)acrylic acid isopropyl ester, (meth)acrylic acid isobutyl ester, (meth)acrylic acid 2-butyl ester, (meth)acrylic acid tert-butyl ester, (meth)acrylic acid 2-pentyl ester, (meth)acrylic acid 3-pentyl ester, (meth)acrylic acid isoamyl ester, (meth)acrylic acid tert-amyl ester, (meth)acrylic acid neopentyl ester, (meth)acrylic acid 2-hexyl ester, (meth)acrylic acid 3-hexyl ester, (meth)acrylic acid 2-methyl-1-pentyl ester, (meth)acrylic acid 3-methyl-1-pentyl ester, (meth)acrylic acid 4-methyl-1-pentyl ester, (meth)acrylic acid isoheptyl ester, (meth)acrylic acid isooctyl ester, (meth)acrylic acid isononyl ester and (meth)acrylic acid isodecyl ester, which can be used singly or in combination of two or more.

Monomer (B) also can be used singly or in combination of two or more. Examples of monomer (B) include (meth)acrylic esters such as (meth)acrylic acid methyl ester, (meth)acrylic acid ethyl ester, (meth)acrylic acid n-propyl ester, (meth)acrylic acid n-butyl ester, (meth)acrylic acid n-octyl ester, (meth)acrylic acid lauryl ester, (meth)acrylic acid stearyl ester, (meth)acrylic acid cyclohexyl ester, (meth)acrylic acid benzyl ester, (meth)acrylic acid isobornyl ester, (meth)acrylic acid 2-methoxyethyl ester, (meth)acrylic acid 2-ethoxyethyl ester, (meth)acrylic acid 2-butoxyethyl ester, (meth)acrylic acid 2-octoxyethyl ester, (meth)acrylic acid 2-lauroxyethyl ester, (meth)acrylic acid 3-methoxybutyl ester, (meth)acrylic acid 4-methoxybutyl ester, (meth)acrylic acid ethyl carbitol ester, (meth)acrylic acid methoxy polyethylene glycol ester (the number of ethylene glycol units (m) is 1 to 50), (meth)acrylic acid methoxy polypropylene glycol ester (the number of propylene glycol units (m) is 1 to 50); and vinyl ethers such as methyl vinyl ether, ethyl vinyl ether, n-propyl vinyl ether, i-propyl vinyl ether, n-butyl vinyl ether, i-butyl vinyl ether, tert-butyl vinyl ether, n-octyl vinyl ether, 2-ethylhexyl vinyl ether and cyclohexyl vinyl ether.

In the above-mentioned explanation, the expression "(meth)acrylic acid ester" means acrylic acid ester and/or methacrylic acid ester.

The polymer of this invention is to be synthesized by emulsion polymerization, suspension polymerization, solution polymerization, bulk polymerization, etc. As a polymerization initiator, there is to be used conventional azo-type polymerization initiator or peroxide. Since this invention relates to the function of polymer, it is not limited at all by how to synthesize polymer.

Paint to which the adhesion improver for amine curing epoxy resin paint of this invention is to be applied is paint which comprises glycidyl-ether type epoxy resin that is curable by the addition of amine type curing agent such as aliphatic polyamine and polyamidepolyamine resin.

It is optional when to add the adhesion improver for amine curing epoxy resin paint of this invention to paint. It can be added during the paint production process (e.g., when pigment is being ground) or after the paint has been produced.

The dosage of adhesion improver of this invention which is to be added to amine curing epoxy resin paint differs depending on the species of resin for paint or the formulation of pigment. Usually, however, it is preferably 0.1% by weight to 5% by weight as non-volatile components on the basis of resin components, more desirably 0.25% by weight to 2% by weight. When the dosage is less than 0.1% by weight, insufficient interlayer adhesion would be given. When it is more than 5% by weight, the physical property of coating film is likely to be affected adversely in various respects.

EXAMPLES

This invention is explained in more detail in the following Examples. Those Examples are, however, not intended to limit this invention. Incidentally, "part(s)" and "%" in the following mean "part(s) by weight" and "% by weight" respectively.

Production Example 1

A 1000-mL reactor equipped with stirrer, reflux condenser, dropping funnel, thermometer and nitrogen gas blowing port was fed with 96.4 parts of butyl acetate, which was then refluxed while nitrogen gas was being introduced. Under the condition that butyl acetate was being refluxed, the following dropping solution (a-1) was dropped with the dropping funnel at a constant rate over a period of 100 minutes.

| Dropping solution (a-1) | |
| --- | --- |
| Acrylic acid isobutyl ester | 207.1 parts |
| Acrylic acid n-butyl ester | 207.1 parts |
| tert-Amylperoxy 2-ethylhexanoate | 20.7 parts |

After the dropping of dropping solution (a-1) was over, reaction was made to proceed further 40 minutes with reflux temperature maintained. After the reaction was over, the content of non-volatile components was adjusted to 50% with butyl acetate to give adhesion improver [A-1]. The number average molecular weight of thus synthesized copolymer in terms of the number average molecular weight of standard polystyrene measured by gel permeation chromatography was 6100.

Production Example 2

Adhesion improver [A-2] was obtained in the same manner as in Production Example 1 except that dropping solution (a-1) was replaced with dropping solution (a-2) as follows.

| Dropping solution (a-2) | |
| --- | --- |
| Acrylic acid isobutyl ester | 289.7 parts |
| Acrylic acid n-butyl ester | 124.5 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 6000.

Production Example 3

Adhesion improver [A-3] was obtained in the same manner as in Production Example 1 except that dropping solution (a-1) was replaced with dropping solution (a-3) as follows.

| Dropping solution (a-3) | |
| --- | --- |
| Acrylic acid isobutyl ester | 414.2 parts |
| tert-Amylperoxy 2-ethylhexanoate | 20.7 parts |

The number average molecular weight of thus synthesized polymer in terms of the number average molecular weight of standard polystyrene measured by gel permeation chromatography was 6300.

Production Example 4

Adhesion improver [A-4] was obtained in the same manner as in Production Example 1 except that dropping solution (a-1) was replaced with dropping solution (a-4) as follows.

| Dropping solution (a-4) | |
| --- | --- |
| Acrylic acid isooctyl ester | 244.3 parts |
| Acrylic acid n-butyl ester | 169.9 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 5400.

Production Example 5

Adhesion improver [A-5] was obtained in the same manner as in Production Example 1 except that dropping solution (a-1) was replaced with dropping solution (a-5) as follows.

| Dropping solution (a-5) | |
| --- | --- |
| Acrylic acid tert-butyl ester | 207.1 parts |
| Acrylic acid n-butyl ester | 207.1 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 5500.

Production Example 6

Adhesion improver [A-6] was obtained in the same manner as in Production Example 1 except that dropping solution (a-1) was replaced with dropping solution (a-6) as follows.

| Dropping solution (a-6) | |
| --- | --- |
| Acrylic acid isobutyl ester | 289.7 parts |
| i-Butyl vinyl ether | 124.5 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 4000.

Production Example 7

Adhesion improver [A-7] was obtained in the same manner as in Production Example 1 except that dropping solution (a-1) was replaced with dropping solution (a-7) as follows.

| Dropping solution (a-7) | |
| --- | --- |
| Methacrylic acid isobutyl ester | 207.1 parts |
| Acrylic acid n-butyl ester | 207.1 parts |
| tert-Amylperoxy 2-ethylhexanoate | 4.1 parts |

The number average molecular weight of thus synthesized copolymer in terms of the number average molecular weight of standard polystyrene measured by gel permeation chromatography was 27000.

Production Example 8

A 2000-mL reactor equipped with stirrer, reflux condenser, dropping funnel, thermometer and nitrogen gas blowing port was fed with 96.4 parts of high boiling solvent SHELLSOL TK (high boiling solvent manufactured by Shell Chemicals Japan Ltd.), which was then refluxed while nitrogen gas was being introduced. Under the condition that SHELLSOL TK was being refluxed (about 190° C.), the following dropping solution (a-8) was dropped with the dropping funnel at a constant rate over a period of 100 minutes.

| Dropping solution (a-8) | |
| --- | --- |
| Acrylic acid isobutyl ester | 207.1 parts |
| Acrylic acid n-butyl ester | 207.1 parts |
| SHELLSOL TK | 414.2 parts |
| tert-Amylperoxy acetate | 49.7 parts |

After the dropping of dropping solution (a-8) was over, reaction was made to proceed further 40 minutes with reflux temperature maintained. After the reaction was over, the content of non-volatile components was adjusted to 40% with SHELLSOL TK to give adhesion improver [A-8]. The number average molecular weight of thus synthesized copolymer in terms of the number average molecular weight of standard polystyrene measured by gel permeation chromatography was 1300.

Production Example 9

Adhesion improver [A-9] was obtained in the same manner as in Production Example 1 except that dropping solution (a-1) was replaced with dropping solution (a-9) as follows.

| Dropping solution (a-9) | |
| --- | --- |
| Acrylic acid i-stearyl ester | 270.2 parts |
| Acrylic acid n-butyl ester | 144.0 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 3900.

Production Example 10

Adhesion improver [A-10] was obtained in the same manner as in Production Example 1 except that dropping solution (a-1) was replaced with dropping solution (a-10) as follows.

| Dropping solution (a-10) | |
| --- | --- |
| Acrylic acid isopropyl ester | 207.1 parts |
| Acrylic acid n-butyl ester | 207.1 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 6000.

Production Comparative Example 1

Adhesion improver [N-1] was obtained in the same manner as in Production Example 1 except that dropping solution (a-1) was replaced with dropping solution (n-1) as follows.

| Dropping solution (n-1) | |
|---|---|
| Acrylic acid n-butyl ester | 414.2 parts |
| tert-Amylperoxy 2-ethylhexanoate | 20.7 parts |

The number average molecular weight of thus synthesized polymer in terms of the number average molecular weight of standard polystyrene measured by gel permeation chromatography was 5900.

Production Comparative Example 2

Adhesion improver [N-2] was obtained in the same manner as in Production Example 1 except that dropping solution (a-1) was replaced with dropping solution (n-2) as follows.

| Dropping solution (n-2) | |
|---|---|
| Acrylic acid i-butyl ester | 124.3 parts |
| Acrylic acid n-butyl ester | 289.9 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 6100.

Production Comparative Example 3

Adhesion improver [N-3] was obtained in the same manner as in Production Example 1 except that dropping solution (a-1) was replaced with dropping solution (n-3) as follows.

| Dropping solution (n-3) | |
|---|---|
| Acrylic acid n-butyl ester | 232.6 parts |
| Acrylic acid ethyl ester | 181.6 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 5500.

Production Comparative Example 4

A 2000-mL reactor equipped with stirrer, reflux condenser, dropping funnel, thermometer and nitrogen gas blowing port was fed with 96.4 parts of high boiling solvent SHELLSOL TK (high boiling solvent manufactured by Shell Chemicals Japan Ltd.), which was then refluxed while nitrogen gas was being introduced. Under the condition that SHELLSOL TK was being refluxed (about 190° C.), the following dropping solution (n-4) was dropped with the dropping funnel at a constant rate over a period of 100 minutes.

| Dropping solution (n-4) | |
|---|---|
| Acrylic acid isobutyl ester | 207.1 parts |
| Acrylic acid n-butyl ester | 207.1 parts |
| SHELLSOL TK | 414.2 parts |
| tert-Amylperoxy acetate | 62.1 parts |

After the dropping of dropping solution (n-4) was over, reaction was made to proceed further 40 minutes with reflux temperature maintained. After the reaction was over, the content of non-volatile components was adjusted to 40% with SHELLSOL TK to give adhesion improver [N-4]. The number average molecular weight of thus synthesized copolymer in terms of the number average molecular weight of standard polystyrene measured by gel permeation chromatography was 800.

Production Comparative Example 5

Adhesion improver [N-5] was obtained in the same manner as in Production Example 1 except that dropping solution (a-1) was replaced with dropping solution (n-5) as follows.

| Dropping solution (n-5) | |
|---|---|
| Acrylic acid isobutyl ester | 207.1 parts |
| Acrylic acid n-butyl ester | 207.1 parts |
| tert-Amylperoxy 2-ethylhexanoate | 3.3 parts |

The number average molecular weight of thus synthesized copolymer in terms of the number average molecular weight of standard polystyrene measured by gel permeation chromatography was 33000.

Production Comparative Example 6

Adhesion improver [N-6] was obtained in the same manner as in Production Example 1 except that dropping solution (a-1) was replaced with dropping solution (n-6) as follows.

| Dropping solution (n-6) | |
|---|---|
| Acrylic acid isoeicosyl ester | 270.2 parts |
| Acrylic acid n-butyl ester | 144.0 parts |
| tert-Amylperoxy 2-ethylhexanoate | 20.7 parts |

The number average molecular weight of thus synthesized copolymer in terms of the number average molecular weight of standard polystyrene measured by gel permeation chromatography was 3700.

TABLE 1

Adhesion improver in Production Examples

| | Adhesion improver | Number average molecular weight | Non-volatile components (%) |
|---|---|---|---|
| Production Example 1 | A-1 | 6100 | 50 |
| Production Example 2 | A-2 | 6000 | 50 |
| Production Example 3 | A-3 | 6300 | 50 |

TABLE 1-continued

Adhesion improver in Production Examples

| | Adhesion improver | Number average molecular weight | Non-volatile components (%) |
|---|---|---|---|
| Production Example 4 | A-4 | 5400 | 50 |
| Production Example 5 | A-5 | 5500 | 50 |
| Production Example 6 | A-6 | 4000 | 50 |
| Production Example 7 | A-7 | 27000 | 50 |
| Production Example 8 | A-8 | 1300 | 40 |
| Production Example 9 | A-9 | 3900 | 50 |
| Production Example 10 | A-10 | 6000 | 50 |

TABLE 2

Adhesion improver in Production Comparative Examples

| | Adhesion improver | Number average molecular weight | Non-volatile components (%) |
|---|---|---|---|
| Production Comparative Example 1 | N-1 | 5900 | 50 |
| Production Comparative Example 2 | N-2 | 6100 | 50 |
| Production Comparative Example 3 | N-3 | 5500 | 50 |
| Production Comparative Example 4 | N-4 | 800 | 40 |
| Production Comparative Example 5 | N-5 | 33000 | 50 |
| Production Comparative Example 6 | N-6 | 3700 | 50 |

Example of Paint Test

The above-mentioned adhesion improvers were subjected to performance test with amine curing epoxy resin paint composition of the formulation as mentioned in Table 3, 1).

TABLE 3

1) First layer
Amine curing epoxy resin paint (Part A)

| Raw material | Quantity (part) | Supplier |
|---|---|---|
| Epikote 828 | 40.0 | Mitsubishi Chemical Corporation |
| Necirès EPX-L2 | 5.0 | PTI JAPAN |
| Talc #1 | 35.0 | TAKEHARA KAGAKU KOGYO CO., LTD. |
| Tipaque R 820 | 10.0 | ISHIHARA SANGYO KAISHA, LTD. |
| Xylene | 5.0 | |
| n-Butanol | 5.0 | |
| DISPARLON 6650 | 1.0 | Kusumoto Chemicals, Ltd. |

(Part B)

| | |
|---|---|
| Curing agent: | VERSAMID 140 (manufactured by Cognis Japan Ltd.)/ xylene/n-butanol = 6/2/2 (20.0 parts) |
| Diluent: | xylene/methyl amyl ketone/n-butanol = 1/1/1 |

TABLE 3-continued

2) Second layer
2K acrylic urethane paint (Part A)

| Raw material | Quantity (part) | Supplier |
|---|---|---|
| Acrydic A801 | 100.00 | DIC Corporation |
| Tipaque CR-93 | 68.11 | ISHIHARA SANGYO KAISHA, LTD. |
| Xylene | 16.00 | |
| Butyl acetate | 4.00 | |
| Carbon Black MA100 | 0.30 | Mitsubishi Chemical Corporation |
| DISPARLON 4200-20 | 1.02 | Kusumoto Chemicals, Ltd. |
| 1% di-n-butyl tin dilaurate (ethyl acetate solution) | 0.68 | |

(Part B)

| | |
|---|---|
| Curing agent: | BURNOCK DN-980 (manufactured by DIC Corporation; 24.15 parts) |

To Part A of Table 3, 1), the adhesion improvers A-1 to A-7 of Table 1 and N-1 to N-5 of Table 2 were each added in the proportion of 0.25% as non-volatile components. The resultant mixture was dispersed with a dissolver at 2000 rpm for one minute.

Curing agent of Table 3, 1) was added to the above-mentioned adhesion improver-containing mixture, and mixed. The resultant mixture was applied to a zinc phosphate-treated steel plate with a 700 μm applicator. Thus coated plate was left to stand for three days at a temperature of 10° C. and a humidity of 80%. This coated plate was further coated by a 250 μm applicator with 2K acrylic urethane paint of Table 3, 2). Thus obtained coated plate was made to cure under room conditions for one week. Interlayer adhesion property was evaluated in accordance with the JIS-K-5400.6.15 cross cut test, as mentioned below.

Eleven parallel vertical cuts and eleven parallel horizontal cuts were made at an interval of 1 mm on the coating film of specimen (coated plate) with a cutter and a cutter guide to give a lattice pattern of 100 squares per $cm^2$. Cellotape (trademark of a cellophane tape manufactured by Nichiban Co., Ltd.) was pressed firmly over the lattice. The tape was then removed, and the number of remaining squares was counted.

Table 4 shows results of the test above.

TABLE 4

| Adhesion improver | Dosage of non-volatile components added (%) | Adhesion |
|---|---|---|
| A-1 | 0.25 | 100/100 |
| A-2 | 0.25 | 100/100 |
| A-3 | 0.25 | 100/100 |
| A-4 | 0.25 | 100/100 |
| A-5 | 0.25 | 100/100 |
| A-6 | 0.25 | 100/100 |
| A-7 | 0.25 | 50/100 |
| A-8 | 0.25 | 40/100 |
| A-9 | 0.25 | 20/100 |
| A-10 | 0.25 | 100/100 |
| N-1 | 0.25 | 0/100 |
| N-2 | 0.25 | 0/100 |
| N-3 | 0.25 | 0/100 |
| N-4 | 0.25 | 0/100 |
| N-5 | 0.25 | 0/100 |
| N-6 | 0.25 | 0/100 |

The invention claimed is:

1. An amine curing epoxy liquid resin paint to be cured under room conditions having interlayer adhesion with a topcoating, said paint containing an adhesion improver in the proportion of 0.1% by weight to 5% by weight, as non-volatile components, on the basis of weight of resin, in which said adhesion improver is an organic solvent solution of a copolymer composed of only (A) acrylic acid ester and/or methacrylic acid ester (hereinafter referred to as monomer (A)) which
is at least one selected from the group consisting of (meth)acrylic acid isopropyl ester, (meth)acrylic acid isobutyl ester, (meth)acrylic acid 2-butyl ester, (meth)acrylic acid tert-butyl ester, (meth)acrylic acid 2-pentyl ester, (meth)acrylic acid 3-pentyl ester, (meth)acrylic acid isoamyl ester, (meth)acrylic acid tert-amyl ester, (meth)acrylic acid neopentyl ester, (meth)acrylic acid 2-hexyl ester, (meth)acrylic acid 3-hexyl ester, (meth)acrylic acid 2-methyl-1-pentyl ester, (meth)acrylic acid 3-methyl-1-pentyl ester, (meth)acrylic acid 4-methyl-1-pentyl ester, (meth)acrylic acid isoheptyl ester, (meth)acrylic acid isooctyl ester, (meth)acrylic acid isononyl ester, and (meth)acrylic acid isodecyl ester, and (B), which is at least one monomer selected from the group consisting of (meth)acrylic acid n-propyl ester, (meth)acrylic acid n-butyl ester, (meth)acrylic acid n-octyl ester, (meth)acrylic acid lauryl ester, (meth)acrylic acid stearyl ester, (meth)acrylic acid cyclohexyl ester, (meth)acrylic acid benzyl ester, (meth)acrylic acid 2-methoxyethyl ester, (meth)acrylic acid 2-ethoxyethyl ester, (meth)acrylic acid 2-butoxyethyl ester, (meth)acrylic acid 2-octoxyethyl ester, (meth)acrylic acid 2-lauroxyethyl ester, (meth)acrylic acid 3-methoxybutyl ester, (meth)acrylic acid 4-methoxybutyl ester, (meth)acrylic acid ethyl carbitol ester, (meth)acrylic acid methoxy polyethylene glycol ester (the number of ethylene glycol units (m) is 1 to 50), (meth)acrylic acid methoxy polypropylene glycol ester (the number of propylene glycol units (m) is 1 to 50), methyl vinyl ether, ethyl vinyl ether, n-propyl vinyl ether, i-propyl vinyl ether, n-butyl vinyl ether, i-butyl vinyl ether, tert-butyl vinyl ether, n-octyl vinyl ether, 2-ethylhexyl vinyl ether and cyclohexyl vinyl ether (hereinafter referred to as monomer (B)), said copolymer comprising at least 50% by weight, based on the weight of total monomer components, of a portion made from the polymerization of monomer (A) and at most 50% by weight, based on the weight of total monomer components, of a portion made from the polymerization of monomer (B), and said copolymer having a number average molecular weight of 1000 to 30000.

2. The amine curing epoxy resin paint of claim 1 wherein the number average molecular weight of said copolymer is 2000 to 20000.

3. The amine curing epoxy resin paint of claim 1 wherein the number average molecular weight of said copolymer is 3000 to 10000.

* * * * *